April 30, 1940.  S. W. LONG  2,198,779
PARKING METER
Filed March 27, 1937   2 Sheets-Sheet 1

INVENTOR
Sam W. Long
BY
Hoguet, Meany & Campbell
his ATTORNEYS

April 30, 1940.  S. W. LONG  2,198,779
PARKING METER
Filed March 27, 1937  2 Sheets-Sheet 2
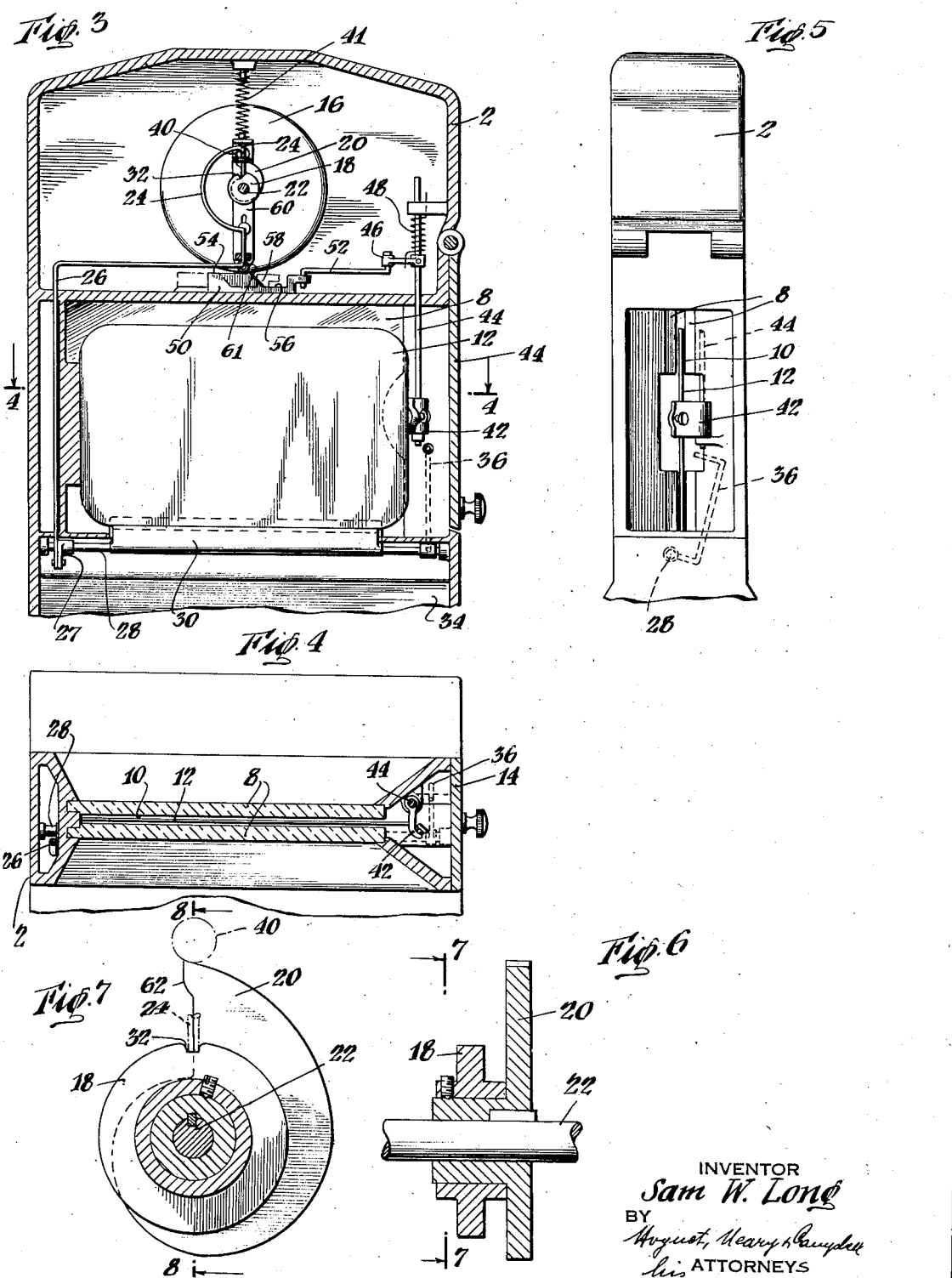
INVENTOR
Sam W. Long
BY
his ATTORNEYS Patented Apr. 30, 1940

2,198,779

UNITED STATES PATENT OFFICE 2,198,779

PARKING METER

Sam W. Long, Oklahoma City, Okla., assignor, by mesne assignments, to Miller Meters, Incorporated, Chicago, Ill., a corporation of Illinois Application March 27, 1937, Serial No. 133,355

8 Claims. (Cl. 194—1)

This invention relates to time measuring devices such as parking meters and the like and particularly to constructions which permit parking without charge or obligation for a limited period of time only but which discourage the abuse of parking privileges by insuring the imposition of a charge or penalty in the event of over-parking.

Parking meters as heretofore constructed and proposed have either been coin operated or they have merely indicated the expiration of a parking period. Devices which require the insertion of a coin immediately upon parking are objectionable to merchants before whose establishments they are located because patrons seek other parking areas rather than pay the fee required for parking in spaces convenient to their establishments. On the other hand, those devices which do not require a coin for operation do not prevent the evils of over-parking unless the police exercise vigilance. Constructions have been proposed which permit free parking for a limited period of time and then operate to prevent removal of the vehicle without the insertion of a coin after expiration of the free parking period. However, such constructions place a positive restraint on the operation of the vehicle and if an attempt is made to remove a car from an area controlled by such a meter without payment of the required fee due to failure to understand the operation of the device or for any other reason the device may be injured or destroyed and in some instances, there is no way to identify the operator causing such damage.

In accordance with the present invention, these objections to the constructions of the prior art are overcome by providing a parking meter which may be operated by a check, card, token or other device to actuate a timing element and permit use of parking privileges for a predetermined period of time without charge but which on expiration of the free parking period require the payment of fines or the reporting to officials of the abuse of the parking privilege.

The mechanism employed may take various forms, but as hereinafter described and as illustrated in the accompanying drawings, the device preferably is actuated upon the insertion of a card or token which is removable during the free parking period, but which at the expiration of the free parking period is prevented from removal and is retained by the parking meter. The token or check employed may carry the license number of the vehicle or may be identified with the owner or operator thereof, or any check may have a definite value. When retained by the meter, means may be provided to prevent its removal or recovery without payment of a fine or reporting the violation of the parking privilege to the officials controlling the parking meter. If the check possesses value it may be retained by the authorities as a source of revenue. Thus free parking is allowed while abuse of the parking privilege imposes a burden on the operator without imposing a burden on the police or restraining operation of the vehicle.

One of the objects of the present invention is to provide a novel type of parking meter whereby a limited free parking period may be allowed.

Another object of the invention is to provide a parking meter which permits free parking for a limited period of time only, but places no restraint upon the operation of the vehicle.

A further object of the invention is to provide a parking meter with a timing device operable to prevent removal of an actuating element therefrom after the expiration of a predetermined free parking period.

Another object of the invention is to provide means for identifying and penalizing those who abuse parking privileges without requiring vigilance on the part of police.

A further object of the invention is to provide a check controlled device with means for retaining the check in an accessible position for a predetermined period of time and operable thereafter to prevent removal of the check from the device.

In the form of the invention herein specifically described and shown, the parking meter is operable by a check identifying an operator and which, after the expiration of the free parking period, is deposited in the meter and is removable therefrom only by proper officials, and, therefore, a specific object of the present invention is to provide a parking meter with time controlled means for retaining a check after a predetermined free parking period, so that the check may be recovered only upon application to the authorities in charge of the meter.

These and other objects and features of the invention will appear from the following description thereof in which reference is made to the accompanying figures of the drawings which illustrate one typical embodiment of the present invention.

In the drawings:

Figure 3 is a vertical sectional view of the construction illustrated in Figures 1 and 2 taken on the line 3—3 of Figure 2;

Figure 4 is a horizontal sectional view of the construction illustrated in Figure 3 taken on line 4—4 thereof;

Figure 5 is an elevation of a portion of the device as seen from the right in Figure 1 with the closure removed;

Figure 6 is an enlarged sectional view of typical elements of the parking meter illustrated in Figures 1, 2 and 3, and Figure 7 is a sectional view of the construction shown in Figure 6 taken on the line 7—7 thereof.

Figure 1:
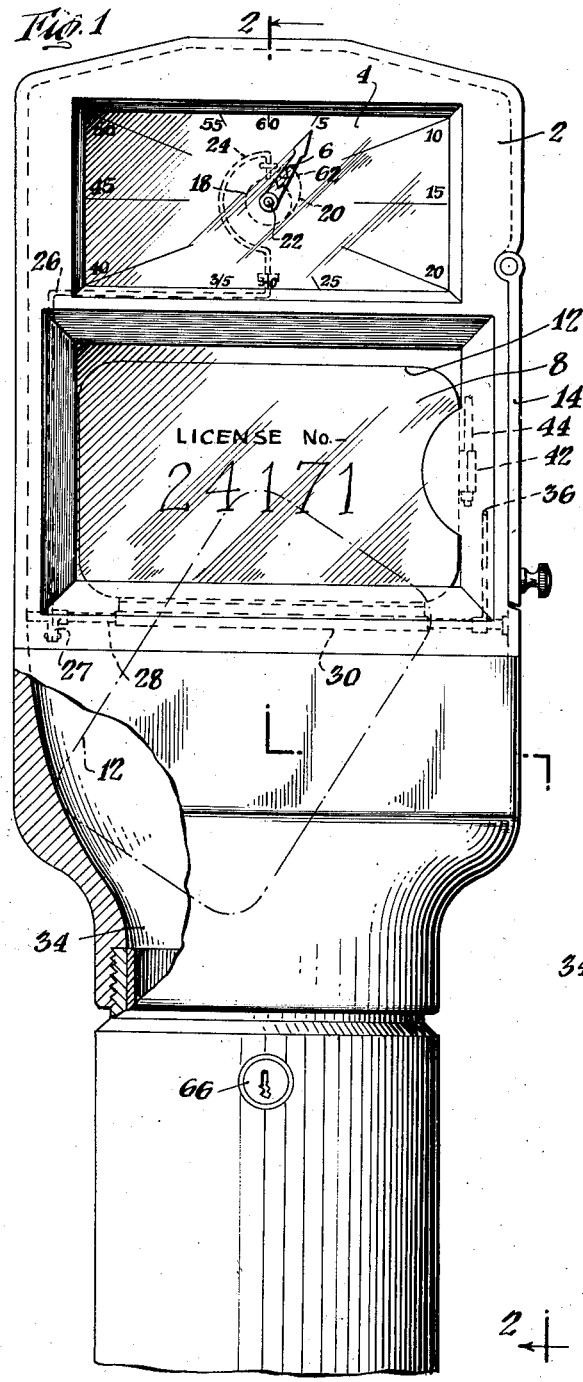
Figure 1 is a front elevation of a typical form of parking meter embodying the present invention, partly broken away.
Figure 2:
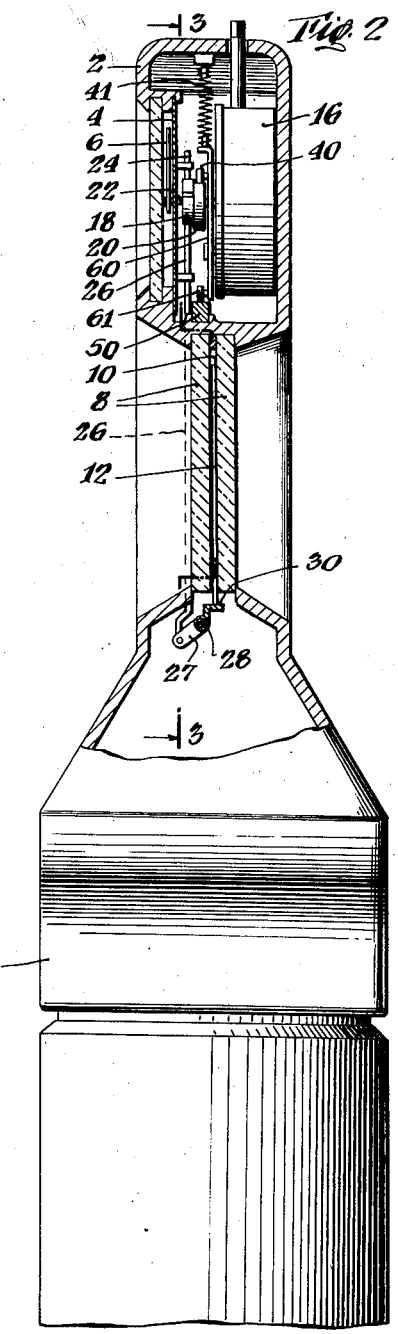
Figure 2 is a vertical sectional view of the construction illustrated in Figure 1 taken on the line 2—2 thereof.

In that form of the invention chosen for the purpose of illustrating a representative embodiment thereof, the mechanism comprises a housing 2 having an indicator such as a clock dial 4 over which a hand 6 is movable to indicate the amount of the parking period which has expired. Below the clock is a sight opening provided with spaced transparent panes 8 through which a card, check, coin or other actuating element may be seen. The panes 8 are spaced apart to form a check receiving space 10 into which a check such as a card 12 may be inserted. The card or check preferably carries the license number of the vehicle or a number or indication identifying the operator and may have no intrinsic value in itself. However, in some instances, the check may be a coin or may be of value to the operator, as when the checks are issued by the police or other authorities for a prescribed fee. The housing also is provided with a closure 14 which may be raised for insertion of the check into the space 10 from which it may be removed at any time prior to the expiration of the free parking period.

Within the housing is located any suitable type of driving mechanism 16 which may be in the form of a conventional spring driven 8-day clock. This mechanism serves to move the hand 6 over dial 4 and to actuate elements for retaining the check in the space 10 during the free parking period and for effecting its removal thereafter as well as for resetting the hand to an initial position when the check is removed from space 10. As shown, these elements are in the form of cams 18 and 20 frictionally or positively mounted on a shaft 22 driven by the mechanism 16 and arranged to make one complete revolution in one hour or in each free parking period.

The cam 18 which serves to actuate suitable check retaining means is shown in Figures 6 and 7 and is generally circular in shape with a notch 32 therein. The cam is engaged by a follower 24 movable to raise and lower a rod 26. The lower end of rod 26 is pivotally connected to an arm 27 secured to a shaft 28 and serves to move a retaining member 30 into and out of position beneath the space 10 so as to retain or effect the release of a card or check inserted in the space 10 between the glass panes 8. When rod 26 is held in raised position by cam 18, the check is retained in position to be observed through the panes during the free parking period. However, on rotation of cam 18 to permit the follower 24 to enter the notch 32, the rod 26 is allowed to move downward to retract the retaining member and permit the check to pass downward in the housing and into a receptacle 34.

The construction also may embody means to prevent the insertion of a card or check into the space 10 when the retaining member 30 is retracted. The means shown is in the form of a pin 36 carried by shaft 28 and movable into and out of the entrance to space 10 upon rocking movement of the shaft and retaining member 30. Thus the pin 36 is moved into the entrance to space 10 when the retaining member is retracted and is withdrawn to permit the insertion of a check or card when the retaining member is in position to hold the check in the space 10.

The resetting cam 20 is helical in shape and is engaged by a follower 40 urged against the cam by a strong spring 41. On engagement of the follower with the cam, the cam is rotated in a counterclockwise direction as seen in Figures 3 and 7 to restore the cam and hand 6 to an initial position for starting a new timing operation.

A check controlled member 42 is pivotally mounted adjacent the entrance to space 10 and is secured to a rod 44. The upper end of the rod has a crank 46 secured thereto so that movement and positioning of the member 42 causes the crank 46 to be similarly moved and positioned. A light spring 48 surrounding the upper end of rod 44 is connected to the crank 46 to urge the member 42 inward against the edge of a card or check located in the space 10. Removal of the check either by the operator or by movement of the retaining member 30 therefore permits the check controlled member to move inward and causes the crank 46 to be moved inward.

The crank 46 is connected to a cam slide 50 by means of a link 52. The cam slide is provided with a high portion 54 and a low portion 56 connected by an inclined surface 58. The follower 40 is carried by a slidable member 60, the lower end of which is provided with a roller 61 bearing against the slide 50 and serves, when in the full line position shown in Figure 3, with the roller 61 engaging the high portion 54 of the cam slide, to hold follower 40 away from cam 20, whereas on movement of the slide to the dotted line position of Figure 3, the roller 61 moves down surface 58 to the low portion 56 of the slide, allowing the cam follower 40 to be lowered into engagement with the cam 20. Movement of the crank 46 and check controlled member 42 thus serves to move the cam slide 50 and effects engagement and disengagement of the follower 40 with cam 20.

In the operation of the mechanism described and when the device is at rest, the follower 24 engages the edge of cam 18 adjacent notch 32 and follower 40 abuts the radial face 62 of helical cam 20. The hand 6 is then at its initial position and the retaining member 30 extends beneath the bottom of space 10. An operator on parking adjacent the meter raises the closure 14, moves the check controlled member 42 back and inserts a card 12 bearing his license number or other identification into the space 10 between glass panes 8 and above the retaining member 30. The member 42 is then released and is held against inward movement by engagement with the edge of card 12. The card is thus held in a position to be visible to those passing the meter during the free parking period.

On movement of the member 42 by the operator to permit insertion of card 12, the crank 46 and slide 50 are moved to the right as seen in Figure 3 so that the roller 61 on the lower end of member 60 rides up surface 58 onto the high portion 54 of the slide, lifting cam follower 40 above the face 62 of helical cam 20. The clock cams 18 and 20 are thus released for rotation, causing the hand 6 to rotate with shaft 22.

The operator may at any time during the free parking period remove the card 12 by opening closure 14 and moving back the check controlled member 42. On removal of the card and release of the member 42, the member 42 is moved inward by spring 48 and the cam slide 50 is moved to the left of Figure 3, lowering follower 40 into engagement with helical cam 20. The cams 18 and 20 and hand 6 are thereupon moved in a counterclockwise direction to their initial or zero position by the strong spring 61. As the cams are returned to initial position the notch 32 in cam 18 will approach the follower 24 but will stop just short of permitting the follower to enter therein. At the same time follower 40 moves into engagement with the face 62 of helical cam 20, preventing further resetting movement of the cams and hand 6.

Preferably, the cams 18 and 20 are directly secured to the shaft, as shown in Figures 6 and 7, so that the clock mechanism may be rewound during the resetting operation. However, if preferred, the cams may be frictionally secured to shaft 22 in which case resetting of the parts as described above will not be burdened with the rewinding of the clock or driving mechanism.

In the event the card 12 is not removed during the free parking period and the cams 18 and 20 make a complete rotation, the notch 32 on cam 18 will be moved into position beneath follower 24 at the end of, say fifty-nine minutes, and the rod 26 then will be lowered, withdrawing retaining member 30 from beneath the card, allowing it to fall downward into receptacle 34. At the same time, pin 36 will be moved into position to prevent insertion of another card into space 10 until the mechanism is reset. As the card passes downward from space 10, the check controlled member 42 is moved inward by spring 48 causing cam slide 50 to move to the left so that member 60 moves down inclined surface 58 to the low portion 56 of the slide and follower 40 engages helical cam 20 to move the cam in a counterclockwise direction to reset the elements. As the cams are rotated to their reset position, the follower 24 rises from notch 32 and rides on the surface of cam 18, the notch 32 coming to rest in a position slightly to the right of follower 24. The mechanism is then in a position preparatory to the initiation of a new parking period, the follower 40 remaining against the radial wall 62 of cam 20 until member 42 is moved outwardly to permit the insertion of a card in space 10, the outward movement of member 42 operating to raise follower 40 from engagement with cam 20 and thereby initiate a new timing operation.

The card passing into receptacle 34 may be recovered in any suitable way, requiring the payment of a fine or the reporting of violations of parking privileges. Preferably the housing is provided with a lock 66 which permits access to the receptacle by authorized persons only, so that the cards or checks may be collected daily or at convenient times for reissue by the authorities on payment of a prescribed fine or in the event the checks are of value, they may be retained as a direct source of revenue.

In any case, whether using checks which identify the operator or are of value in themselves, the abuse of parking privileges is discouraged without requiring payment by those who do not park longer than is allowed by the free parking period. At the same time, no restraint is placed on the operation of the vehicle so that neither the meter nor the vehicle will be damaged on removal of a vehicle from the parking area.

While the construction herein described and illustrated in the drawings is designed for use with a check in the form of a card issued by the police or other authorities, it will be evident that other forms and types of checks may be used in the operation of the device. It will also be evident that other forms of operating means may be used for actuating the various elements of the device and that the card or checks used in actuating the mechanism may be recovered in any suitable way to impose a penalty on an operator abusing the parking privilege. It should therefore be understood that the form of the invention herein described and shown in the drawings is intended to be illustrative of a typical embodiment thereof and is not intended to limit the scope of the invention.

I claim:

1. A parking meter comprising timing means, an indicator actuated by said timing means, resetting means comprising a cam operatively connected to said indicator, follower means, means biasing said follower means to engage and urge said cam in a direction to return said indicator to initial position, control means movable to a position to effect removal of said follower means from cam engagement so as to release said timing means for operation, means biasing said control means for movement to another position to effect reengagement of said cam by said follower means to reset said indicator to initial position, means for supporting a check, means cooperating with said check in its supported position to retain said control means in said first mentioned position, a second cam means operatively connected to said indicator, and means operatively associated with said supporting means and said second cam means and actuatable after a predetermined movement of said indicator to effect removal of said check from said supported position, said control means being biased to a position to effect reengagement of said cam by said follower upon removal of said check.

2. A parking meter having a housing with an opening therein into which a check may be inserted, means for retaining said check in position to permit removal thereof by an operator, driving mechanism, and indicator actuated by said driving mechanism, check controlled means for initiating operation of said mechanism, means operatively connected to said check retaining means and actuatable by said driving mechanism after a predetermined interval for effecting the removal of said check from said removable position, and means for actuating said check controlled means as the result of the removal of said check from said removable position for resetting said indicator to an initial position.

3. A parking meter having a housing with an opening therein into which a check may be inserted, means for retaining said check in position to permit removal thereof by an operator, a driving mechanism, a time indicator actuated by said mechanism, check controlled means for initiating operation of said mechanism, means operatively connected to said check retaining means and actuatable by said mechanism after a predetermined interval for effecting the removal of said check from said removable position, means operable as the result of removal of said check from said position for resetting said timing indicator, and means operable on removal of said check for preventing insertion of another check into said opening prior to the resetting of said indicator.

4. A parking meter having a time indicator and driving mechanism therefor, check controlled means for initiating operation of said driving mechanism, means for retaining a check in position to be observed during operation of said indicator, means actuated by said driving mechanism for effecting removal of said check from said position on predetermined movement of said indicator and means for resetting said time indicator to an initial position, said check controlled means being operable as a result of the removal of said check from said position for initiating operation of said resetting means.

5. A parking meter having a timing indicator, timing mechanism for operating said indicator, means for supporting a check in an accessible position, check controlled means engageable by a check when the check is placed on said supporting means for initiating operation of said timing mechanism, means including a cam and a follower element actuated by said timing mechanism for effecting removal of said check from said supporting means upon the expiration of a predetermined interval, and means operatively connected to said check controlled means for resetting said indicator to an initial position as a result of the removal of said check from engagement with said check controlled means.

6. A parking meter having a time indicator and driving means therefor, check controlled means adapted to initiate operation of said driving means upon reception of a check, means for resetting said time indicator to an initial position, means actuated by said driving means upon operation thereof for a predetermined interval of time for effecting removal of said check from said check controlled means, and means operatively connected to said check controlled means and operable thereby upon removal of said check from said check controlled means to initiate operation of said resetting means.

7. A parking meter having a time indicator and driving means therefor, means for supporting a check, means responsive to the placing of a check on said supporting means for initiating operation of said driving means and responsive to removal of said check from said supporting means to reset said indicator to an initial position, and means operatively connected to said supporting means and actuatable by said driving means after a predetermined interval of time to effect removal of said check from said supporting means.

8. A parking meter having a housing with timing means therein, an indicator actuated by said timing means, means for resetting said indicator, means movable to one position for initiating operation of said timing means and means for biasing the third mentioned means to another position for initiating operation of said resetting means, means for supporting a check within said housing in a position to retain said means for initiating operation of said timing means in said one position, and means operatively associated with said supporting means and actuatable after a predetermined movement of said timing means to effect removal of said check from said position, said biasing means being rendered operable by removal of said check.

SAM W. LONG.